Dec. 12, 1939.  O. E. E. STROMBERG  2,183,371
BRAKE FOR TRAILERS
Filed Feb. 10, 1938  2 Sheets-Sheet 1
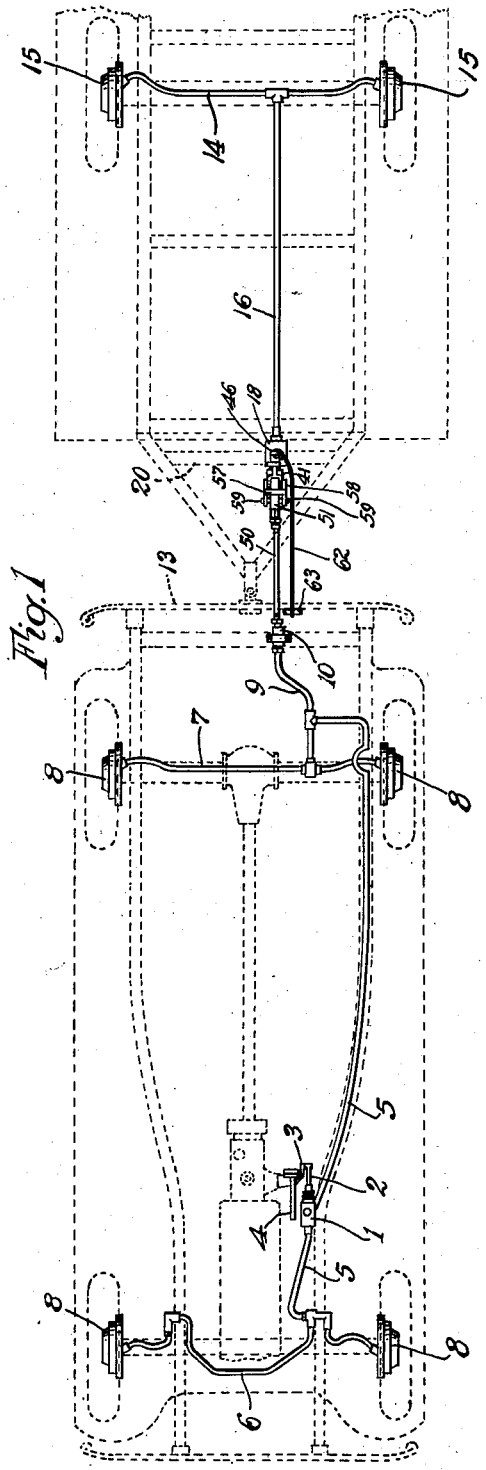
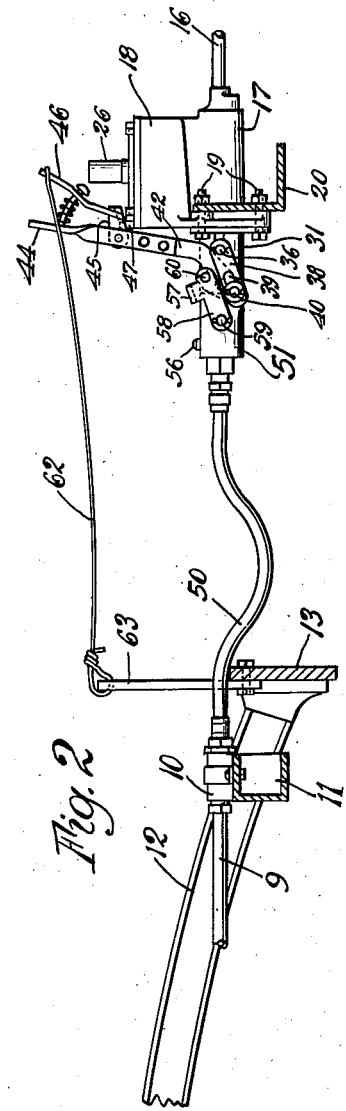
Inventor
Olaf E. E. Stromberg
by Parker & Carter
Attorneys

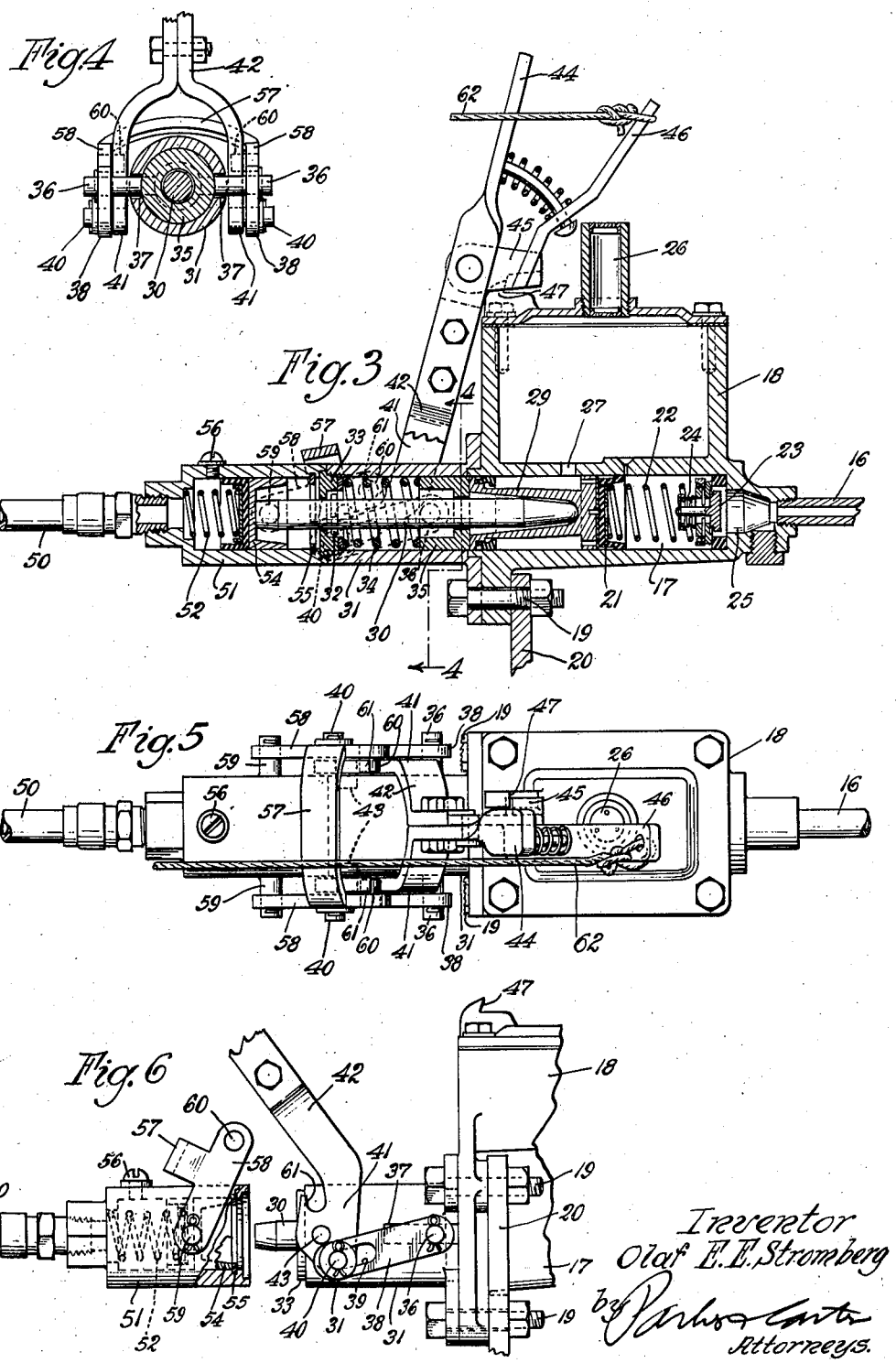

Patented Dec. 12, 1939

2,183,371

UNITED STATES PATENT OFFICE 2,183,371

BRAKE FOR TRAILERS

Olof E. E. Stromberg, Chicago, Ill.

Application February 10, 1938, Serial No. 189,711

14 Claims. (Cl. 188—3)

My invention relates to improvements in brakes for trailers and the like. The invention is primarily adapted for use with house cars and similar trailers which are aided by ordinary passenger automobiles having hydraulic brake systems though the mechanism which I propose to use might under some circumstances be equally well used with pneumatic or even mechanical brakes by making simple and obvious changes in the structure.

One object of my invention is to provide on an automobile and on a trailer two separate hydraulic systems which may be connected and disconnected at will without interfering with the operation of either and wherein the hydraulic supply in each system is separate, there being an intimate connection between the systems such that the manipulation of the hydraulic system on the passenger vehicle will automatically cause operation of the hydraulic system on the trailer. Another object is to provide automatic means whereby the two systems may be disconnected in the event of an inadvertent breakage of the towing coupling without interfering with the operation of either system and whereby such disconnection will automatically apply the brakes on the trailer. Other objects of my invention will appear from time to time throughout the specification and claims.

My invention is illustrated more or less diagrammatically in the accompanying drawings, wherein—

Figure 1 is a layout in plan view of the hydraulic system showing the vehicle and trailer in dotted lines;

Figure 2 is a side elevation in part section on an enlarged scale showing the coupling between the two vehicles;

Figure 3 is a longitudinal section through the coupling and the master cylinder on the trailer;

Figure 4 is a section along the line 4—4 of Figure 3;

Figure 5 is a plan view of the parts shown in Figure 3;

Figure 6 is a side elevation in part section showing the connection uncoupled.

Like parts are indicated by like characters throughout the specification and drawings.

1 is a master brake cylinder having a piston rod 2, and a lever 3, adapted to be rotated to push the piston rod and the piston contained within the master cylinder forwardly in response to pressure on the brake lever 4. 5 is a hydraulic pipe connecting the master cylinder 1, with the front wheel hydraulic pipe 6 and the rear wheel hydraulic pipe 7. The pipes 6 and 7 connect to the usual type of actuating pistons not shown associated with brake drums 8, on front and rear wheels. This is just the usual type of hydraulic transmission characteristic of the type of automobiles on the road today. 9 is a trailer brake pipe extending from the pipe 5, rearwardly to a socket 10 mounted on the rear automobile cross member 11, supported on the rear ends of the frame 12.

13 is a trailer hitch support mounted on the rear ends of the frame members 12, and adapted to support a trailer hitch of any suitable type. 14, is a pipe associated with brake cylinders not shown in brake drums 15, on the trailer wheels. This pipe 14 is connected by means of a pipe 16, to a trailer master cylinder 17. Associated with the master cylinder 17, is an oil reservoir 18, the whole bolted as at 19, to a part of the trailer frame 20. 21 is a master plunger mounted for reciprocation in the cylinder 17. 22 is a spring tending to move the master plunger to the left to release brake pressure in the trailer. 23 is a safety valve which is held by the spring 24 against a seat as indicated in Figure 3. When the plunger 21 is moved to the right, hydraulic liquid in the cylinder 17 is forced across the seat of the valve 23 compressing the spring 24 and allowing the hydraulic fluid to pass into the pipe 16, to apply the brakes on the trailer. If there should be a breakage in that part of the system, beyond the valve 23, then the valve 23 would, by the too sudden rush of hydraulic fluid, be moved further to the right into the cylindrical valve seat 25, to prevent excessive escape of fluid from the system. Under normal circumstances, this valve 23, has no effect on the operation of the apparatus. 26, is a filler cap for the oil reservoir and ports 27 insure that the hydraulic braking system will always be kept full, the filler cap 26, providing an air chamber. The space behind the piston 21 is kept full of oil which enters through the port 27, make up oil can pass around the piston and when the piston moves to the right the brake is applied.

The piston 21, is mounted on a hollow guide sleeve 29 slidable in the cylinder 17. 30 is an operating pin in effect a piston rod, socketed at one end in the sleeve 29, immediately behind the piston 21, and projecting at its other end outwardly beyond the sleeve 31, which is a prolongation of the cylinder 17. 32 is a pin rigidly mounted on the member 30. Movement toward the left is limited by engagement with the apertured plug 33 in the end of the sleeve 31. The spring 22, tends to force the piston 21, the sleeve 29, and the pin 30 to the left.

34 is a spring within the sleeve 31. It abuts at one end on the inner end of the plug 33, but is out of contact with the pin 30, and abuts at the other end on an apertured sleeve 35, slidable in the sleeve 31. This sleeve 35, has two radially opposed trunnion pins 36, extending out through slots 37 in the sleeve 31. Upon these pins are pivoted links 38, which links are slotted at 39, and in pivotal engagement where they are slotted with pins 40, on the two ends 41 of a U-shaped lever 42. The lever ends 41 are pivoted on pins 43, on the ends of the sleeve 31. 44 is a lever handle upon which is pivoted a latch dog 45 controlled by a latch handle 46, the latch dog being adapted to engage a latch abutment 47 on the oil reservoir 18, to hold the lever 44 in the position shown in Figure 3. When that is the case, the lever exerts a tension on the links 38 to compress the spring 34 and hold the sleeve 35 in the position shown in Figure 3 with the plunger 21 in the inoperative position, that is in the position in which the brakes are not applied. When the latch is released the lever rotates into the position shown in Figure 6 allowing the sleeve 35 to be forced inwardly by the spring 34 moving the piston 21 to the right and thereby applying the brakes on the trailer.

50 is a flexible hydraulic hose connected at one end to the socket 10 and at the other end to the coupling socket 51. This coupling socket is of substantially the same diameter as the sleeve 31. It contains a spring 52, a piston 54 forced outwardly or to the right as in Figure 3 by the spring 52 limited in its outward movement by the spring lock ring 55. 56 is a filler hole in the wall of the coupling sleeve 51. 57 is a yoke joining two links 58, which links are pivoted on pins 59 on the sleeve 51 and are provided at their other ends with inwardly extending pins 60 which are adapted to engage locking grooves 61 on the two arms of the lever 42. In the position shown in Figures 3, 4 and 5, the pins 60 engage the grooves 61 and the lever is in the locked position. Under these circumstances the piston 21 is free to move in the cylinder 17. The piston 54 is free to move in the sleeve 51 and the pistons 54 and 21 are connected by the pin 30 under compression. The pressure on the spring 52 and in the hydraulic system on the automobile is sufficient to force the pin 30 slightly to the right to disengage the collar 32 from its contact with the plug 33 so that the parts are all free and floating. Under these circumstances when the operator of the automobile applies the brakes, the hydraulic pressure in the brake system will force the plunger 54 to the right. The mechanical connection embodied in the push pin 30 will force the master cylinder 21 of the trailer system to the right and apply the trailer brakes. When the automobile driver releases the brakes, pressure in the automobile system will fall and the spring 22 will force the piston 21 to the left and force the piston 54 to the left releasing the brakes on the trailer simultaneously with the release of the brakes on the automobile. 62 is a safety cable engaged at one end on a bracket 63 at the rear end of the automobile and at the other end on the end of the latch handle 46. This cable 62 is shorter than the pipe 50 but both are long enough so that as long as the coupling between the automobile and the trailer is not disconnected, they hang loose and are under no tension no matter what the relation position of the two vehicles. If, however, it should happen that the trailer hitch should let go and the trailer cease its forward movement while the automobile continued the cord 62 will come under tension before any tension is applied to the tube 50. Tension on the cord 62 will rotate the latch handle 46 and release the latch whereupon the spring 34 will move the sleeve 35 to the right rotating the lever 42 in a counter-clockwise direction to permit the pin 60 to disengage from the notches 61 so that the coupling sleeve 51 will be disconnected from the trailer.

When this happens the spring 52 will force the piston 54 from the position shown in Figure 3 back to the position shown in Figure 6 against the lock ring 55 thus slightly increasing the volumetric capacity of the hydraulic system on the automobile but merely requiring a slightly further movement of the brake pedal by the operator to apply the brakes of the automobile and there will be under these circumstances no leakage of hydraulic fluid from the automobile system. At the same time the spring 34 which has pushed the sleeve 35 to the right will apply a pressure to the sleeve 29 and so to the piston 21 and thereby apply the brakes on the trailer, again without any loss of hydraulic fluid from the trailer system. The slots 39 permit the lever 42 under these circumstances after the sleeve 35 has reached its further excursion to the right to rotate even further the pins 40 sliding in the sleeve 39 so that the lever can swing down freely without interference.

I claim:

1. A braking system for automobiles and trailers and the like comprising a fluid brake system on the automobile, a master cylinder associated with such system and adapted to be controlled by the operator, a fluid brake system on the trailer, a master cylinder associated therewith, a connection between the master cylinder on the automobile and the master cylinder on the trailer whereby when the brakes are applied by manipulation of the master cylinder on the automobile, the pressure generated in the automobile system causes manipulation of the master cylinder on the trailer to apply the brakes, an automatically releasable connection between the system on the trailer and on the automobile, and means responsive to excessive separation of trailer and automobile for releasing such connection.

2. A braking system for automobiles and trailers and the like comprising a fluid brake system on the automobile, a master cylinder associated with such system and adapted to be controlled by the operator, a fluid brake system on the trailer, a master cylinder associated therewith, a connection between the master cylinder on the automobile and the master cylinder on the trailer whereby when the brakes are applied by manipulation of the master cylinder on the automobile, the pressure generated in the automobile system causes manipulation of the master cylinder on the trailer to apply the brakes, an automatically releasable connection between the system on the trailer and on the automobile, means responsive to excessive separation of trailer and automobile for releasing such connection, and means on trailer and automobile for closing the released ends of the fluid connection automatically when they are disconnected.

3. In a brake system, a master cylinder, a piston mounted for reciprocation therein, a sleeve in continuation of the cylinder, a piston rod extending outwardly beyond the end of the sleeve, means for limiting the outer excursion of the rod, a connection cylinder and means for releasably locking it in alignment with the first mentioned sleeve, a piston therein, a fluid connection to one side of the piston, and yielding means, operative upon the separation of the sleeve and connection cylinder for displacing the piston in the connection cylinder to exert a pressure in the fluid connection, the piston being adapted to engage the end of the piston rod when the cylinder and sleeve are connected.

4. In a brake system, a master cylinder, a piston mounted for reciprocation therein, a sleeve in continuation of the cylinder, a piston rod extending outwardly beyond the end of the sleeve, means for limiting the outer excursion of the rod, a connection cylinder and means for releasably locking it in alignment with the first mentioned sleeve, a piston therein, a fluid connection to one side of the piston, the piston being adapted to engage the end of the piston rod when the cylinder and sleeve are connected, a releasable latch adapted to hold the cylinder and sleeve together, and a brakable tension member adapted first to release the latch and then to operate the master cylinder to apply the brake.

5. A fluid brake system including a master cylinder, an operating piston, a piston rod, a closure for one end of the cylinder encircling the piston rod, and means for limiting the outward excursion of the rod through the closure, a connecting cylinder in alignment with the master cylinder, a connecting piston therein, adapted to engage the free end of the piston rod, a spring interposed between the cylinder closure and the piston, a latch associated with the cylinder and adapted to releasably engage the connecting cylinder and a connection between the latch and the spring adapted when the latch is in the connecting position to compress the spring, and when the latch is in the disconnected position to release the spring whereby it forces the piston into the brake applying position.

6. In combination, two vehicles, a fluid brake system on each, a coupling between them, a master cylinder on one vehicle and a connection cylinder on the other, an operating piston and a piston rod in the master cylinder, a closure for one end of the cylinder and means for. limiting the outward excursion of the rod therethrough, a connecting piston in the connecting cylinder adapted to engage the free end of the piston rod, a spring interposed between the cylinder closure and the piston, a latch adapted to hold the two cylinders together and a connection between the latch and the spring adapted when the latch is in the connecting position to compress the spring, when the latch is in the disconnected position to release the spring, whereby it may force the piston into brake applying position.

7. A fluid brake system including a master cylinder, an operating piston, a piston rod, a closure for one end of the cylinder encircling the piston rod, and means for limiting the outward excursion of the rod through the closure, a connecting cylinder in alignment with the master cylinder, a connecting piston therein, adapted to engage the free end of the piston rod, a spring interposed between the cylinder closure and the piston, a latch associated with the cylinder and adapted to releasably engage the connecting cylinder and a connection between the latch and the spring adapted when the latch is in the connecting position to compress the spring, and when the latch is in the disconnected position to release the spring whereby it forces the piston into the brake applying position, and means for limiting the outward excursion of the connecting piston when it is released from contact with the piston rod.

8. In combination, two vehicles, a fluid brake system on each, a coupling between them, a master cylider on one vehicle and a connection cylinder on the other, an operating piston and a piston rod in the master cylinder, a closure for one end of the cylinder and means for limiting the outward excursion of the rod therethrough, a connecting piston in the connecting cylinder adapted to engage the free end of the piston rod, a spring interposed between the cylinder closure and the piston, a latch adapted to hold the two cylinders together and a connection between the latch and the spring adapted when the latch is in the connecting position to compress the spring, when the latch is in the disconnected position to release the spring, whereby it may force the piston into brake applying position, and means for limiting the outward excursion of the connecting piston when it is released from contact with the piston rod.

9. A fluid brake system including a master cylinder, an operating piston, a piston rod, a closure for one end of the cylinder encircling the piston rod, and means for limiting the outward excursion of the rod through the closure, a connecting cylinder in alignment with the master cylinder, a connecting piston therein, adapted to engage the free end of the piston rod, a spring interposed between the cylinder closure and the piston, a latch associated with the cylinder and adapted to releasably engage the connecting cylinder and a connection between the latch and the spring adapted when the latch is in the connecting position to compress the spring, and when the latch is in the disconnected position to release the spring whereby it forces the piston into the brake applying position, the connection between the spring and latch comprising an abutment ring slidable in the master cylinder, the wall of the master cylinder being slotted, a trunnion projecting through said slots and a linkage between the trunnion and the latch lever.

10. In combination, two vehicles, a fluid brake system on each, a coupling between them, a master cylinder on one vehicle and a connection cylinder on the other, an operating piston and a piston rod in the master cylinder, a closure for one end of the cylinder and means for limiting the outward excursion of the rod therethrough, a connecting piston in the connecting cylinder adapted to engage the free end of the piston rod, a spring interposed between the cylinder closure and the piston, a latch adapted to hold the two cylinders together and a connection between the latch and the spring adapted when the latch is in the connecting position to compress the spring, when the latch is in the disconnected position to release the spring, whereby it may force the piston into brake applying position, the connection between the spring and latch comprising an abutment ring slidable in the master cylinder, the wall of the master cylinder being slotted, a trunnion projecting through said slots and a linkage between the trunnion and the latch lever.

11. A fluid brake system including a master cylinder, an operating piston, a piston rod, a closure for one end of the cylinder encircling the piston rod, and means for limiting the outward excursion of the rod through the closure, a connectig cylinder in alignment with the master cylinder, a connecting piston therein, adapted to engage the free end of the piston rod, a spring interposed between the cylinder closure and the piston, a latch associated with the cylinder and adapted to releasably engage the connecting cylinder and a connection between the latch and the spring adapted when the latch is in the connecting position to compress the spring, and when the latch is in the disconnected position to release the spring whereby it forces the piston into the brake applying position, and means for limiting the outward excursion of the connecting piston when it is released from contact with the piston rod, the latch comprising a lever, a locking cam therefor, and a connection between said locking cam and the opposed vehicle, a pipe between the fluid system on the vehicle carrying the connecting cylinder, the connecting cylinder long enough to reach to the other vehicle and a connection between such vehicle and the latch shorter than the pipe connection.

12. In combination, two vehicles, a fluid brake system on each, a coupling between them, a master cylinder on one vehicle and a connection cylinder on the other, an operating piston and a piston rod in the master cylinder, a closure for one end of the cylinder and means for limiting the outward excursion of the rod therethrough, a connecting piston in the connecting cylinder adapted to engage the free end of the piston rod, a spring interposed between the cylinder closure and the piston, a latch adapted to hold the two cylinders together and a connection between the latch and the spring adapted when the latch is in the connecting position to compress the spring, when the latch is in the disconnected position to release the spring, whereby it may force the piston into brake applying position, and means for limiting the outward excursion of the connecting piston when it is released from contact with the piston rod, the latch comprising a lever, a locking cam therefor, and a connection between said locking cam and the opposed vehicle, a pipe between the fluid system on the vehicle carrying the connecting cylinder, the connecting cylinder long enough to reach to the other vehicle and a connection between such vehicle and the latch shorter than the pipe connection.

13. A fluid brake system, including a master cylinder, a piston therein, a hydraulic brake system and a spring adapted to force the piston normally in a direction opposed to its movement for brake application, a closure for one end of the master cylinder, a piston rod associated with the piston and projecting outwardly through the closure, means on closure and rod interlocking to limit the outward excursion of the piston and piston rod, a spring between the closure and the piston, a sliding spring abutment in the cylinder, a connection sleeve and means for yieldably latching it against the end of the master cylinder, a piston in the connecting sleeve abutting against the end of the piston rod, and means for subjecting the opposed end of said piston to fluid pressure, a latch lever adapted simultaneously to lock the sleeve and cylinder together, and to force the spring abutment ring in a direction opposed to brake application, means for locking the lever in position, means for releasing the lock to permit the spring to rotate the lever, and to force the piston outwardly to apply the brakes.

14. In combination, two vehicles coupled together, an operator controlled fluid actuated braking system on one, a separate fluid actuated braking system on the other, two aligned cylinders one associated with each braking system, releasable means for holding the cylinders in end to end relationship, a piston in each cylinder exposed on one side to its respective fluid braking system, a mechanical pressure connection between the two pistons, yielding means associated with the piston in the second mentioned braking system tending normally to force it in a direction to apply braking pressure and means associated with the releasable means for rendering said yielding means inoperative while the releasable means hold the pistons together.

OLOF E. E. STROMBERG.